Dec. 3, 1957 W. VILLMAN 2,815,403

TRUNK SWITCHING IN SIGNALING SYSTEM

Filed April 26, 1956

Inventor:
Walter Villmann.
By. [signature] Atty

United States Patent Office 2,815,403

Patented Dec. 3, 1957

2,815,403

TRUNK SWITCHING IN SIGNALING SYSTEM

Walter Villman, Munich, Germany, assignor to Siemens & Halske Aktiengesellschaft, Berlin and Munich, Germany, a corporation of Germany

Application April 26, 1956, Serial No. 580,887

Claims priority, application Germany May 5, 1955

4 Claims. (Cl. 179—18)

Figures 1, 2:
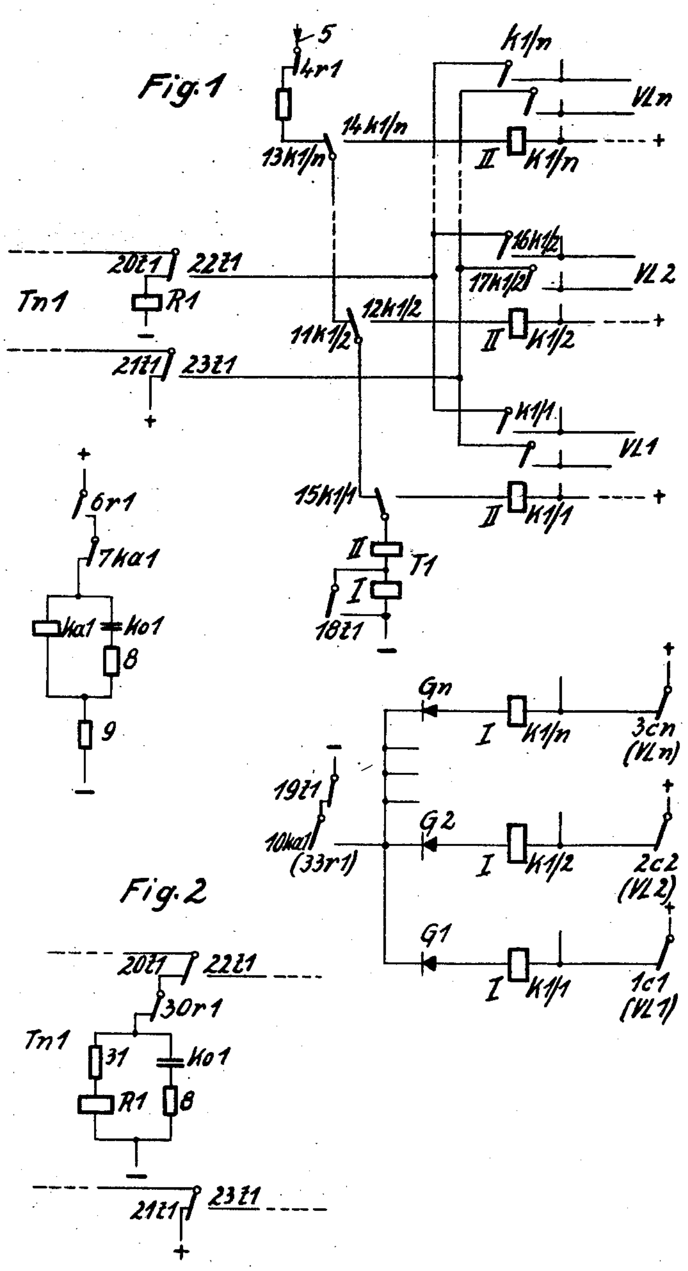

This invention relates to signaling systems, especially telephone systems, and is particularly concerned with a system comprising relay switches, each provided with coupling relays corresponding in number to the number of outgoing trunks accessible to the corresponding switch, and means for simultaneously testing all outgoing trunks.

In accordance with prior proposals, cross connections with an idle outgoing trunk due to interconnecting therewith two or more nearly simultaneously calling lines are to be prevented by contact chains which always give preference to one incoming calling line over other incoming calling lines. These arrangements produce a brief coupling signal in the relay switch. The calling line receives busy tone when all outgoing trunks are busy. It is accordingly impossible to place a calling line in waiting condition until an outgoing trunk becomes idle.

The object of the invention is to give calling subscribers the possibility to wait until an outgoing trunk becomes idle and to avoid thereby as far as possible cross connections which might occur in the presence of several waiting subscribers by interconnection thereof with one and the same outgoing trunk at the instant when such trunk becomes idle.

This object is realized by causing a coupling signal relay allotted to an incoming line to place responsive to a call signal test potential simultaneously on all coupling relays for a time interval just sufficient for the seizure of an idle outgoing trunk, such operation being under control of auxiliary means and particularly under control of a resistor-capacitor circuit which determines the switching intervals of said coupling signal relay; causing responsive to the presence of a plurality of idle outgoing trunks a chain contact circuit controlled by the coupling relays to effect connection of only the first trunk ascertained by the chain to be idle; and by causing the coupling signal relay responsive to busying of all outgoing trunks to repeat the connection of the test potential after the lapse of a time interval determined by the auxiliary circuit control means.

The coupling signal relay may be a relay which is switched in by the line relay and adapted to operate in the manner of a self-interrupter.

In accordance with another feature of the invention, a special coupling signal relay may be avoided by causing the line relay to produce the brief coupling signals. Upon energizing, the line relay disconnects itself from the calling line. Its eneregizing interval depends not only upon the capacitor-resistor circuit which affects its switching times but also upon the line resistance of the corresponding subscriber line. In such embodiment, the operation according to which the coupling signal relays of several incoming lines place the test potential at different times on the coupling relays, is more certain than in the first-mentioned embodiment. Cross connections due to interconnection of two calling incoming lines with an outgoing trunk are practically prevented.

The foregoing and other objects and features of the invention will appear from the description of embodiments which is rendered below with reference to the accompanying drawing, wherein Fig. 1 shows an embodiment comprising for each incoming line a special coupling signal relay; and Fig. 2, illustrating only a modified portion of Fig. 1, shows the use of the line relay as a coupling signal relay.

The drawings show only the switching means and circuits required for the understanding of the invention.

References VL1, VL2 . . . VL*n* indicate outgoing trunks; reference T*n*1 indicates conductors of a subscriber line assumed to be calling. Assuming that trunk line VL1 is busy, contact 1*c*1, controlled by a not illustrated relay associated with such trunk, will be open. The other trunks VL2 . . . VL*n*, assumed to be idle, have similar relays respectively associated therewith (not shown) which control contacts similar to 1*c*1, namely, contacts such as 2*c*2 and 3*cn*. These latter contacts are accordingly closed.

Responsive to initiation of a call on line T*n*1 (Fig. 1), relay R1 will energize in the line loop circuit and will accordingly open contact 4*r*1 disposed in circuit with a private conductor 5 coming from the connectors (not shown). At its contact 6*r*1, relay R1 closes an energizing path for a special coupling signal relay K*a*1, extending in a circuit 1. $$+, 6r1, 7ka1, \frac{Ka1}{Ko1, 8}, 9, -$$

Upon termination of the energizing interval of relay K*a*1, which is determined by the charging interval of the capacitor Ko1, contact 10*ka*1 will be closed, connecting negative (−) potential to the circuits of the coupling relays K1/1, K1/2 . . . K1/*n* respectively associated with the outgoing trunk lines VL1, VL2 . . . VL*n*. The coupling relay K1/1 cannot energize because contact 1*c*1 is open. Relays K1/2 . . . K1/*n* however energize and respectively open contacts 11*k*1/2 and 13*k*1 while closing contacts 12*k*1/2 and 14*k*1/*n*. A holding path is now completed only for the coupling relay K1/2 over winding II thereof, extending in a circuit 2. —, I T1, II T1, 15*k*1/1, 12*k*1/2, II K1/2, +

The line conductors are now switched through to the trunk VL2 over contacts 16*k*1/2 and 17*k*1/2. Private or control conductors may be switched through in similar manner.

Cutoff relay T1 energizes in circuit "2" and closes its contact 18*t*1 to place a shunt around its winding I, thereby busying the outgoing trunk VL2 in known manner. At contact 19*t*1, relay T1 opens a point in the circuit of windings I of all coupling signal relays K1. At contacts 20*t*1 and 21*t*1, relay T1 opens the loop circuit for relay R1, switching the subscriber line T*n*1 at contacts 22*t*1 and 23*t*1 through to the line conductors of the seized outgoing trunk V2. Relay R1 deenergizes and opens contact 6*r*1 to prevent renewed energization of the coupling signal relay K*a*1.

It shall be assumed now that all outgoing trunks are busy. The coupling signal relay K*a*1 upon energizing opens its contact 7*ka*1 and after discharge of the capacitor K*o*1 over its winding restores, opening its contact 10*ka*1. Contact 7*ka*1 is closed again. Relay K*a*1 reenergizes after the lapse of an interval determined by the capacitor-resistor circuit K*o*1, 8, connected in parallel to its winding, thus repeating the coupling signal by closing its contact 10*ka*1. The operation, namely, energization and deeneergization of relay K*a*1 followed by reenergization thereof, etc., continues until one of the outgoing trunks becomes idle. The coupling relay of such trunk, for example, K1/1 will thereupon energize and the calling incoming line T*n*1 will be switched through to the idle outgoing trunk VL1 generally as described before.

In the event that calls are initiated on other incoming lines such as T*n*1, while T*n*1 is waiting to be connected with an idle trunk, the coupling signal relays of such other lines likewise produce coupling signals in predetermined spacing determined by the corresponding capacitor-resistor circuits. Due to the capacitor-resistor circuits, the various coupling signal relays do not have completely identical energization-deenergization intervals. Accordingly, at the instant when an outgoing trunk becomes idle, one coupling signal relay will produce the coupling signal sooner than the other coupling relays. The call from the corresponding line is thus extended and a call waiting on a second line will be extended over another trunk when such trunk becomes idle.

In the arrangement according to Fig. 2, the line relay R1 also functions as a coupling signal relay. When a call is initiated on the corresponding line T*n*1, the line relay R1 will energize in a circuit 3. $$+, 21t1, \text{line loop}, 20t1, 30r1, \frac{31, R1}{Ko1, 8}, -$$

Relay R1 energizes after the lapse of an interval determined by the line resistance and the capacitor-resistor arrangement connected in parallel to its winding, and produces the coupling signal as described in connection with Fig. 1 by closure of its contact **33*r*1 which takes in such embodiment the place of contact 10*ka*1. Upon energizing, relay R1 opens its contact 30*r*1**, thereby disconnecting itself from the corresponding subscriber line. If the call is not extended during the restoring interval of relay R1 which depends on the discharge current of the capacitor K*o*1, due to all outgoing trunks being busy, the cutoff relay T1 will not actuate its contacts **20*t*1 and 21*t*1 to disconnect R1 from the calling line, and relay R1, after closing its contact 30*r*1** will again energize with some delay.

The line relays of several incoming lines on which there are waiting calls due to all outgoing trunks being busy, have operating times which are due to different resistances of the respectively associated lines more different than the operating times of the locally operated coupling signal relays according to Fig. 1. When a trunk becomes idle, the coupling relay which energizes first and closes contact 33*r*1, will produce the coupling signal. The corresponding signal results in the operations already described.

Changes may be made within the scope and spirit of of the appended claims.

I claim:

1. In a telephone system and the like having relay switches and trunks accessible thereto, an arrangement for simultaneously testing outgoing trunks accessible to a relay switch, said arrangement comprising coupling signal relays respectively individual to incoming lines, control means for determining the duration of switching intervals of each coupling signal relay, means operated by a coupling signal relay responsive to a coupling signal received thereby for connecting due to the operation of said control means test potential to all remaining coupling relays for a time interval just sufficient for effecting seizure of an idle outgoing trunk, chain contact means controlled by said coupling relays to secure switching through to the first one of several idle trunks, said coupling signal relays being in the presence of all-trunk-busy condition effective to repeat connection of said test potential after a time interval determined by said control means.

2. An arrangement according to claim 1, comprising a capacitor-resistor circuit constituting said control means.

3. An arrangement according to claim 2, comprising means controlled by said coupling signal relay to cause actuation thereof in the manner of a self-interrupter, a line relay, and contact means controlled by said line relay for operatively connecting said coupling relay.

4. An arrangement according to claim 2, wherein said coupling signal relay is a line relay individual to an incoming line, the duration of the switching intervals of said line relay being determined by said control means and by the resistance of the associated line, and contact means controlled by said line relay upon actuation thereof to disconnect itself from the associated line.

No references cited.